O. P. NYSTROM.
MOLDING MACHINE.
APPLICATION FILED NOV. 28, 1914.

1,172,898.

Patented Feb. 22, 1916.
5 SHEETS—SHEET 1.

WITNESSES:
Howard H. Yarrington
Mae Pauxin

INVENTOR
Oscar P. Nystrom
BY
Moulton & Livrance
ATTORNEYS.

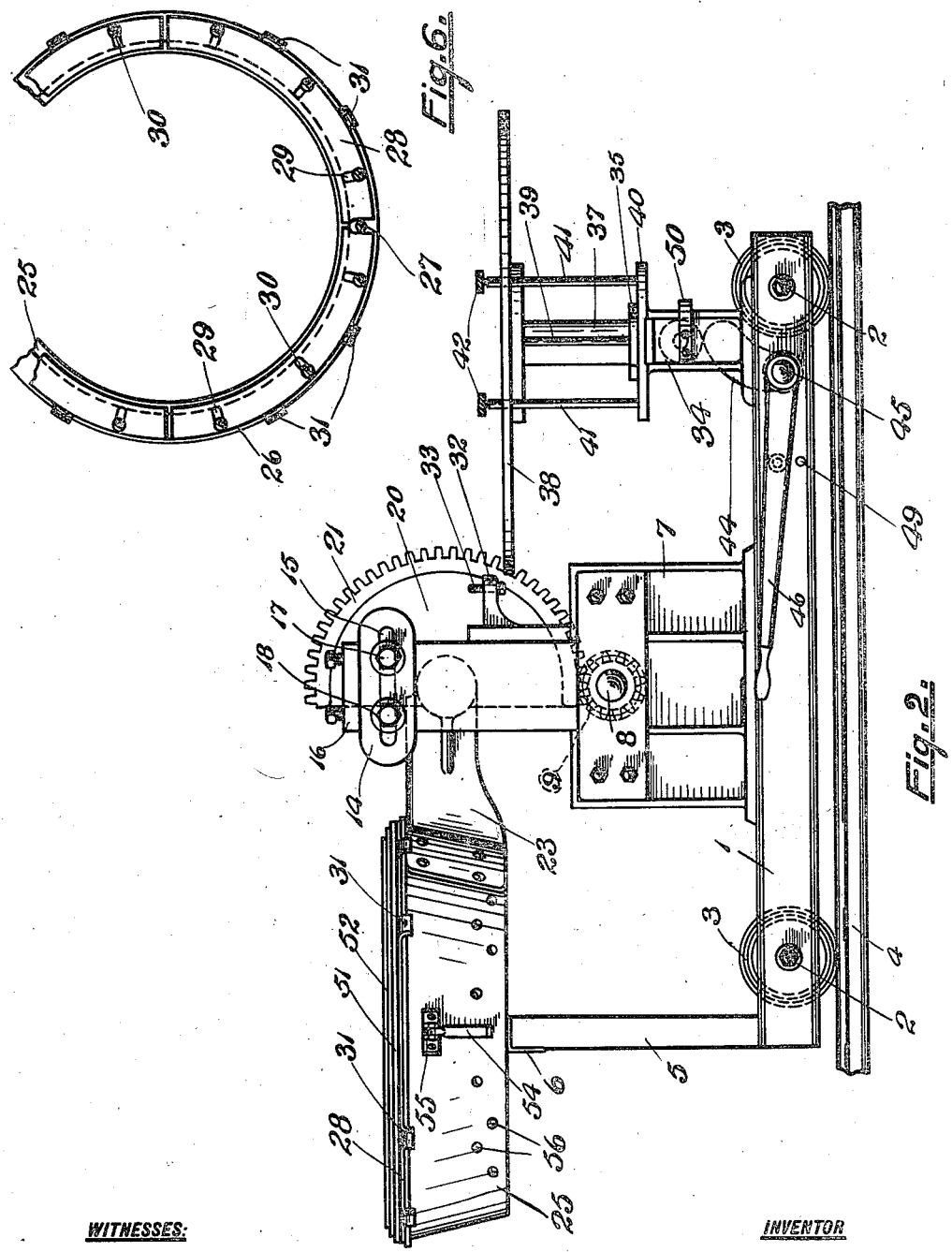

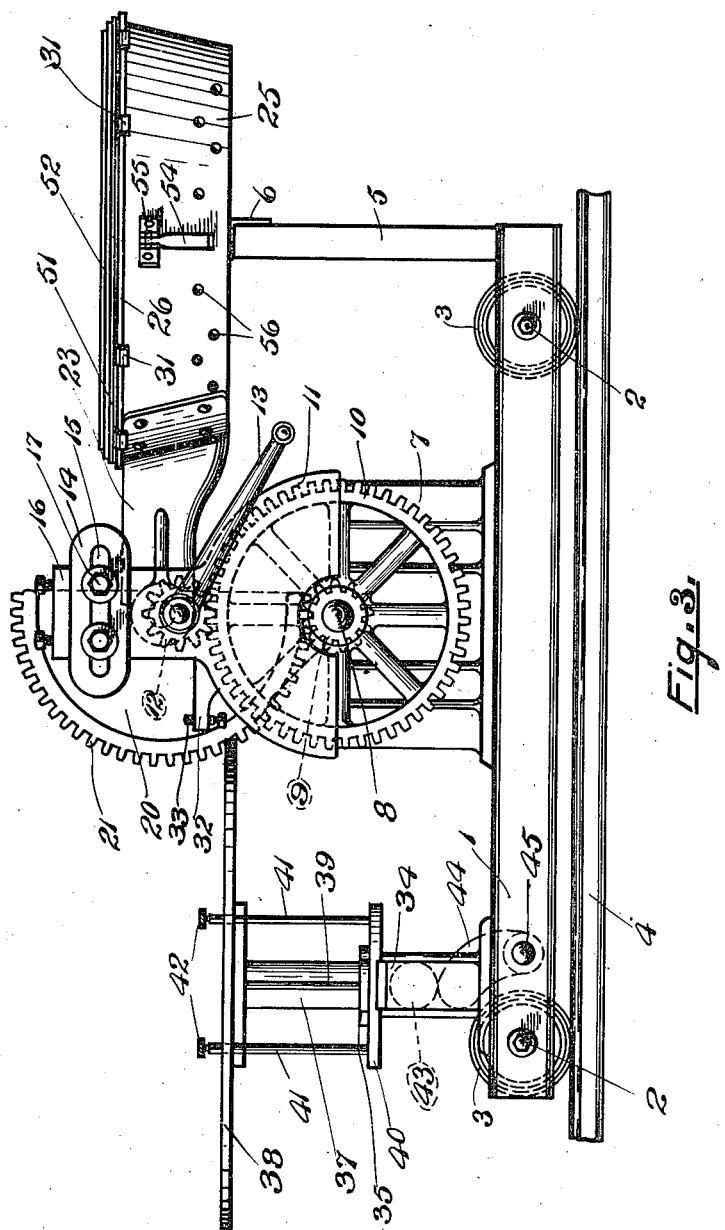

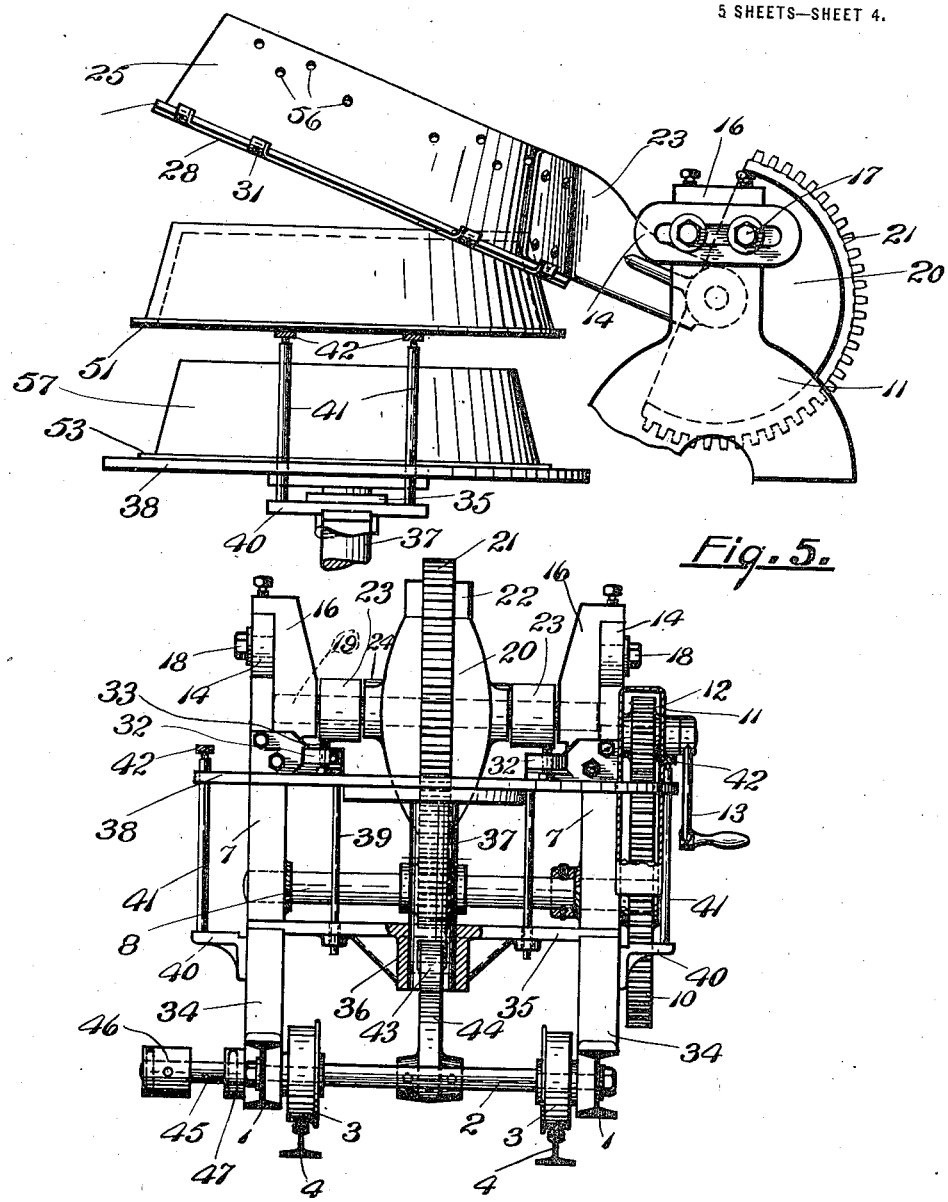

O. P. NYSTROM.
MOLDING MACHINE.
APPLICATION FILED NOV. 28, 1914.

1,172,898.

Patented Feb. 22, 1916.
5 SHEETS—SHEET 5.

Witnesses
Howard H. Yarrington
Marie York

Inventor
Oscar P. Nystrom
By Moulton & Lurance
Attorneys.

UNITED STATES PATENT OFFICE.

OSCAR P. NYSTROM, OF HOLLAND, MICHIGAN.

MOLDING-MACHINE.

1,172,898.  Specification of Letters Patent.  Patented Feb. 22, 1916.

Application filed November 28, 1914. Serial No. 874,477.

*To all whom it may concern:*

Be it known that I, OSCAR P. NYSTROM, a citizen of the United States of America, residing at Holland, in the county of Ottawa and State of Michigan, have invented certain new and useful Improvements in Molding-Machines; and I do hereby declare the following to be a full, clear, and exact description of the invention, such as will enable others skilled in the art to which it appertains to make and use the same.

This invention relates to a molding machine adapted to be used in foundries by means of which molds can be made, using green sand, much more expeditiously than heretofore, greatly reducing the cost of labor, and also by means of which the completed molds may be made of smaller size than heretofore, whereby a great saving in floor space in the foundry is effected.

Figure 1:
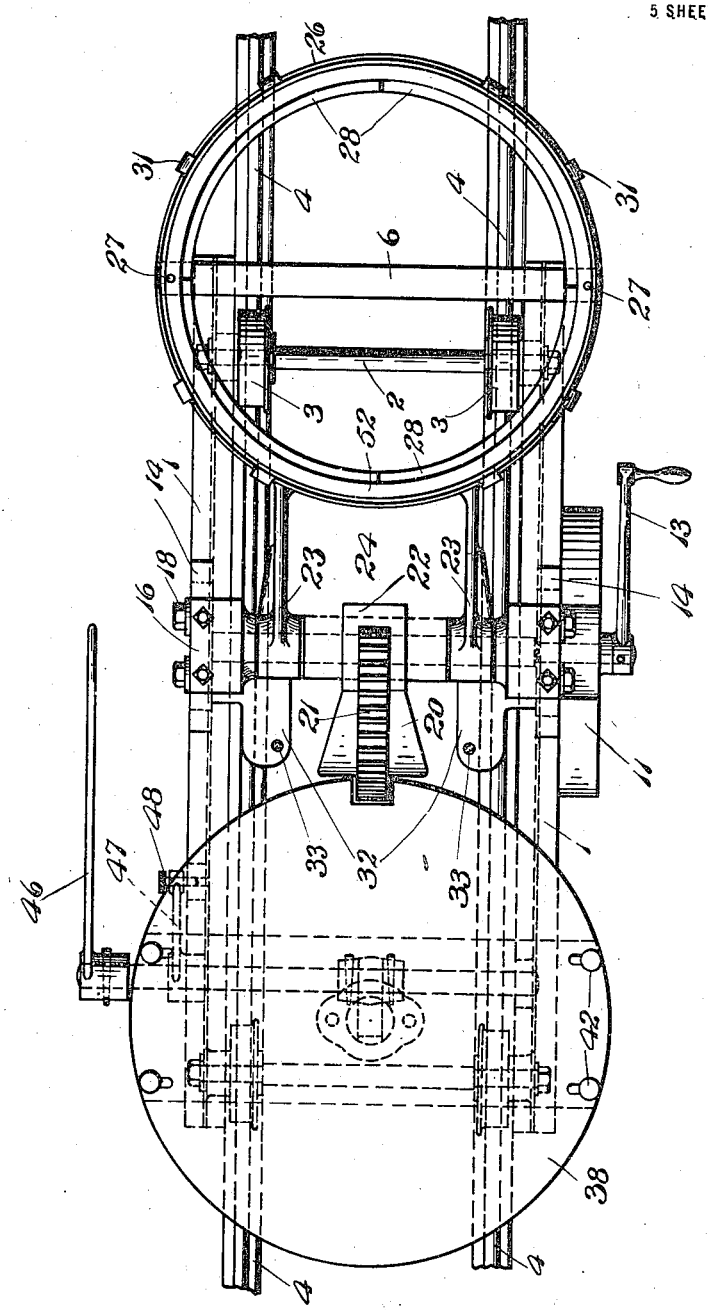
Figure 7:
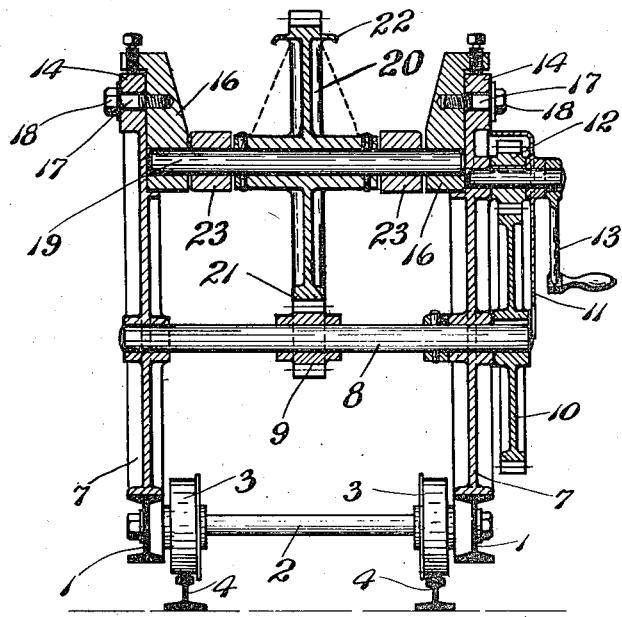
Figure 8:
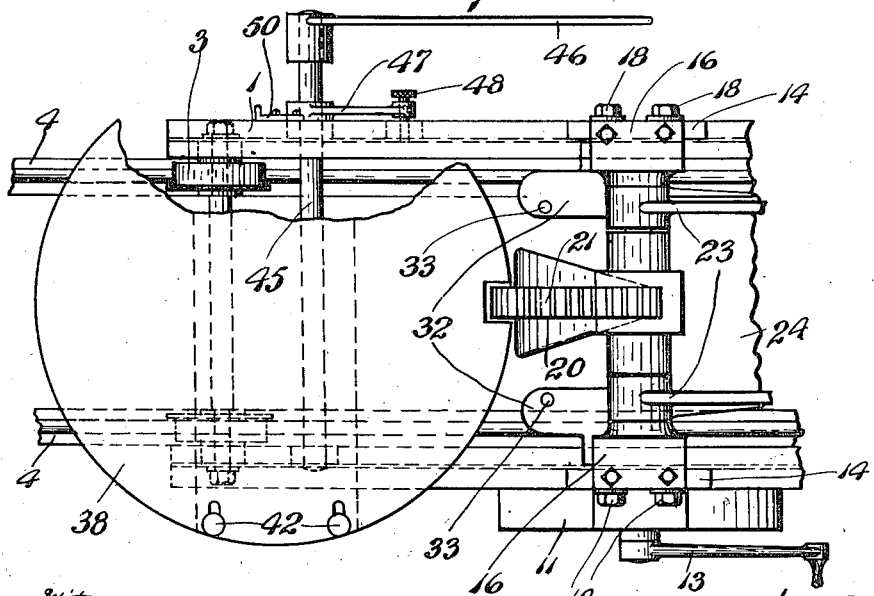

The invention has for its object and purpose this saving of labor and floor space together with the provision of many new and useful features of construction and operation in a machine of this character, which will fully appear upon understanding being had of the construction shown in the accompanying drawings, in which;

Figure 1 is a plan view of the molding machine. Fig. 2 is a side elevation thereof from one side of the machine. Fig. 3 is a view similar to Fig. 2, but from the opposite side of the machine. Fig. 4 is an end elevation thereof; and Fig. 5 is a fragmentary side elevation illustrating the operation of drawing the pattern from the mold in the said molding machine. Fig. 6 is a plan view of the flask, a part thereof being broken away. Fig. 7 is a vertical section taken substantially midway between the ends of the machine and showing the gearing mechanism for operating the same. Fig. 8 is a partial plan of the machine with a portion of the table broken away.

Like reference characters refer to like parts throughout the several views of the drawings.

In the embodiment of my invention illustrated, there is provided a carriage including spaced apart I-beams 1 connected together in any suitable manner and between which are located shafts 2, carrying rollers 3 adapted to bear on the rails 4 whereby the carriage may be moved to any desired position along the length of said rails. At one end of each of the I-beams 1, an upright 5 is provided, the upper ends of these spaced apart uprights being connected by a cross member 6 formed of angle iron as shown.

Substantially midway between the ends of each of the members 1 of the carriage, a casting 7 is secured to the upper side thereof extending vertically and serving as supports for the cross shaft 8 rotatably mounted therein. A pinion 9 is secured to this shaft between the ends thereof and at one end a large gear 10 is also secured to the shaft, being positioned to the side of one of the castings 7 and partially covered by the guard 11 which extends over the upper portion of gear 10 and also covers a pinion 12 mounted on a short shaft above the gear 10 and adapted to be manually operated through the handle 13, as will be readily understood. By operation of this handle the shaft 8 and pinion 9 may be rotated in either direction.

The upper ends of each of the castings 7 has provided thereon a head 14 slotted lengthwise as indicated at 15. Castings 16, one at each side of the machine have studs 17 projecting outwardly therefrom through the slot 15 which may be secured rigidly in position with reference to the head 14 by nuts 18. It will be evident that the castings 16 may be adjusted back and forth relative to said heads 14 and that any mechanism associated with said castings will be moved therewith. A shaft 19 extends between and is rotatively supported in the lower portions of said castings 16, said shaft having attached thereto substantially midway between its ends, a heavy casting 20 flaring outwardly as best shown in Fig. 1 and having attached thereto or formed integral therewith the segment of a large gear shown at 21 which meshes with the pinion 9 heretofore described. A thin extension 22 is formed adjacent the upper portion of the casting 20 and below the gear segment 21 when said segment is in the position shown in Figs. 1, 2 and 3, the object of which construction will later appear.

To either side of casting 20 arms 23 are mounted on and rigidly attached to the shaft 19 in spaced apart relation with a plate 24 covering the space between the arms. A member indicated at 25 and formed with an open bottom hereafter designated as the "flask" is rigidly attached to the arms 23, said flask being adapted to rest on the angle iron cross member 6 heretofore described in one position of the mechanism. Adjacent its upper edge the flask has an outwardly turned flange 26 from which in diametrical opposed relation pins 27 extend upwardly. A series of plates 28 hereafter designated as "sand retainers" have formed therein slots 29 which receive the shanks of screws 30 passing through said slots into the flange 26 of the flask. Handles 31 formed integral with these plates are of use to manually operate the plates back and forth within the limits prescribed by the slots 29, in one position the plates extending over the inner edges of the flange 26, this position being illustrated in Fig. 5, and in another position lying substantially in alinement with said inner edges of the flange.

A pair of spaced apart brackets 32 are secured to the castings 7, one to each casting, each being provided with a screw threaded stud 33 which may be adjusted vertically through the brackets. These studs are positioned relatively to the arms 23, so that when on operation of the crank 13 and the revolution of pinion which is in mesh with the gear segment 21, said arms will be carried over and strike against the studs serving as a stop against their further movement of the attached flask 25.

Adjacent the ends of each of the carriage members 1 and opposite the ends to which the uprights 5 are attached a supporting casting 34 is fixedly secured extending vertically a distance, between which castings the cross bar 35 is secured. A cylindrical lug 36 cast integral with the cross bar 35 and projecting downwardly therefrom is bored to slidably receive the cylindrical post 37 to the upper end of which a table 38 circular in outline is secured. This table and post 37 are adapted to be moved up and down with reference to the cross bar 35 and rods 39 fastened to the table extend downwardly through the cross bar 35 serve as guides and help to steady the table in its movements. A bracket 40 is secured in fixed relation on the outer side of each of the castings 34 serving as supports, each for the pair of upwardly extending rods 41 which project through slotted openings in the table 38 and which at their upper ends carry headed members 42 screw threaded into the rods 41 so as to be adjustable with relation thereto. A roller 43 is rotatably mounted in the lower end of the post 37 and rests on a cam 44 fixed to a shaft 45 extending between and supported in the members 1 of the carriage. The shaft and cam are operable by means of a handle 46, it being evident that by operation of said handle through an arc of substantially ninety degrees, the table 38 may be moved from its highest to its lowest position or vice versa. An arm 47 is fixed to the shaft 45 adjacent one of the members 1 and is adapted to be engaged by pin 48 which may be inserted in either of two openings 49 in said member 1 to retain the handle in the position indicated in Fig. 1 or in a position slightly below that shown. This permits the location of table 38 and the holding of the table in two upper positions, one slightly below the other, both being very near the upper limit of the movement of the table. A stop 50 is rigidly secured to the casting 34 projecting outwardly therefrom and serving to limit the downward movement of the table by engagement with the arm 47 as will be readily understood.

In the operation of the machine the flask 25 is located as shown in Figs. 2 and 3 and the sand retaining plates 28 pushed inwardly to project over the inner edges of the flange 26 of the flask. The pattern 51 is then placed in the flask, it having openings in the flange thereof to receive the pins 27, thereby holding the pattern in rigid relation to the flask. Above the pattern a ring 52 is then positioned, it also having openings through which pins 27 project, the ring 52 being used to make possible a desired thickness of sand above the pattern. The flask is then in condition to receive the sand from which the mold is made, it being placed in and tamped around the pattern and filled substantially to the level of the upper edge of the ring 52. After this operation has been completed the sand is struck level with the upper edge of the ring and a plate 53 placed thereover and clamped to the flask by means of the hooks 54 pivotally attached to brackets 55 which are secured in diametrically opposed positions on the outside of the flask 25. The hooks are turned upward and extend over the plate 53 binding it securely against the sand and the ring 52. After this has been done crank 13 is operated, the flask and its contents being carried through an arc of substantially one hundred and eighty degrees or until the arms 23 come in contact with the studs 33 and with the plate 53 substantially in engagement with the table 38. In this position, the remaining portion of the mold may be completed, sand being tamped against the other side of the pattern. It will be observed that the flask is provided with a plurality of openings 56 adjacent the lower edge thereof and when the sand is being placed on the opposite side of the mold, rods are passed through the flask through these openings and the sand tamped around the rods, it being evident that they will help to retain this part of the mold when the flask is raised to the position shown in Fig. 5. After the sand has been properly placed, it is struck level and the pouring inlet formed after which the flask is rapped and hooks 54 disengaged from the plates 53 which being practically in contact with the table 38 will rest thereon. Handle 46 is then operated to permit the lowering of the table 38, the plate 53 and the lower portion of the mold as indicated at 57 resting on and lowering with the table while the edges of the pattern 51 rest on the headed screws 42 thus drawing the lower portion of the mold from the pattern. Crank 13 is thereupon operated to elevate the flask 25 and the upper portion of the mold as shown in Fig. 5. The rods 56 and the sand retainers 28 keep the upper portion of the mold from dropping from the flask. After the flask has been elevated the pattern 51 and the ring 52 may be removed, and the flask and that part of the mold contained therein lowered to position. The table 38 and the lower part of the mold in the meantime are elevated to uppermost position with the handle 46 pressed downwardly so that the pin 48 will engage with the lowermost opening 49. When this is done the two portions of the mold will come together into close contact, the extra elevation of the table 38 being exactly equal to the thickness of the flange of the pattern 51. The rods passed through the openings 56 are then removed and the sand retainers 28 drawn to outer position upon which the table 38 may be again lowered and the flask 25 returned to its original position leaving the upper part of the mold in proper position over the lower portion thereof. Said plate and the mold thereabove are thereupon removed from the table 38 after which the process described may be repeated indefinitely. When the molds are poured it is only necessary to place a jacket around the mold, this serving to retain the mold against breaking during the process of pouring. Said jacket may be removed within a very short time after one mold is poured and used with other molds.

From the construction and operation of the machine as described, it will be evident that I have provided a machine which may be operated very rapidly and in which molds of great size and weight may be very easily made and handled without the necessity of expensive cranes or like mechanism. This machine is operated by two men, one at either side thereof and molds weighing five hundred pounds or more are very easily and readily handled. Heavy retaining flasks are not required as in the ordinary process of molding. A great saving of floor space is accomplished in that only the space actually needed for the mold itself is used where heretofore a large rectangular flask inclosing the mold has been needed with its attendant waste of space. In actual practice at least twice as many castings may be made with this machine in a given time than under the old process of individual flasks for each mold, and the floor space required is cut down at least one-third or more.

The parts of the mechanism are protected from the sand, as guard plate 22 and the outwardly flaring casting 20 serve to throw outwardly and away from the gearing any sand which may have fallen over on the plate 24 or which may come through the base plate 53 which, necessarily, must be perforated for the required ventilation.

Various modifications in minor detail may be resorted to without departing from my invention which is defined in the appended claims and which comprises all modifications in structure falling within the scope of said claims.

I claim:—

1. In a molding machine, spaced apart vertical supports, a cross member connecting the upper ends thereof, a post slidably mounted for vertical movement in the cross member, a table attached to the upper end of said post, means for raising and lowering the post and table, rods carried by the supports and extending upwardly through the table and means adjustable in a vertical direction carried in the upper ends of the rods, substantially as described.

2. In a molding machine, spaced apart supports, a shaft rotatably mounted between and carried by the supports, a casting having a thickened outer portion secured to the shaft, a gear segment secured to the casting, a second shaft mounted between the supports below the first shaft, a pinion thereon meshing with the gear segment, arms spaced apart and connected to the first shaft, a plate covering the space between said arms, a flask connected to the free ends of the arms, a manually operable handle and gearing connections between said handle and the second shaft, substantially as described.

3. In combination, spaced apart upright supports, castings adjustably mounted at the upper ends for horizontal movement with respect to the supports, a shaft rotatably mounted in and between the castings, a gear segment connected therewith, spaced apart arms connected to the shaft, a flask connected to the free ends of the arms, means including a second shaft having a pinion thereon engaging the gear segment for rotating said first shaft and flask through substantially a half circle, and means for supporting the flask in substantially horizontal position at either extreme of its rotative movement.

4. In a molding machine, spaced apart vertical supports, a shaft rotatably mounted between and carried by the supports, a casting secured to the shaft, a gear segment at the outer portion of the casting, gearing connections operatively associated with said gear segment including a crank for the manual operation thereof, arms extending from the shaft, a flask connected to the free ends of the arms, a support for the flask at one side of the vertical supports, brackets extending from the vertical supports on the opposite side thereof, and set screws mounted in the ends of said brackets, said brackets positioned in spaced relation apart a distance substantially equal to the distance between said arms whereby the arms will rest on the screws when the flask is carried to one extreme of its movements, substantially as described.

5. In a molding machine, spaced apart vertical supports, a shaft carried by and between said supports, a gear segment on the shaft, gearing connections in engagement with the gear segment for rotating the shaft, a flask secured to and rotatable with the shaft, means to support the flask in substantially horizontal position at either side of the vertical supports, vertical supports at one side of the first supports, a cross member connecting the upper ends thereof, a post slidably mounted for vertical movement in the cross member, a table attached to the upper ends of said post, a shaft positioned beneath the post and having a cam engaging with the lower end of the post, means to turn said last mentioned shaft a partial rotation to thereby elevate or lower the post and the table connected thereto, and headed rods carried by the last mentioned vertical supports and extending upwardly through the table, substantially as described.

6. In a molding machine, a carriage including spaced apart horizontal members, vertical supports extending upwardly from each member, a cross member connecting the upper ends thereof, a post slidably mounted for vertical movement in the cross member, a table attached to the upper end of said post, a horizontal shaft rotatably mounted in the said members, a cam secured thereto and engaging with the lower end of the post, an operating handle fixed to an end of the shaft, an arm fixed to the shaft adjacent one of the members, and a pin adapted to pass through openings in the arm and said member to hold the table in position with respect to the supports, substantially as described.

7. In combination, spaced apart upright supports, each at its upper end having a slotted head, castings provided with lateral studs adjustably mounted on said supports, said studs passing through the slots in the heads, a shaft rotatably mounted in and carried between the castings, a gear segment connected to the shaft, spaced apart arms connected to the shaft, a flask connected to the ends of the arms, means to support the flask in substantially horizontal position at either side of the shaft, gearing mechanism engaging with the gear segment for operating the flask between its two positions, a table mounted for vertical movements at one side of the supports and directly beneath the flask in one of its positions, and devices extending through the table and fixed with respect to the supports, said table movable vertically with respect to said devices, substantially as described.

In testimony whereof I affix my signature in presence of two witnesses.

OSCAR P. NYSTROM.

Witnesses:
 HENRY WINTER,
 ALEX. VAN ZANTAN.